United States Patent [19]

Champlin et al.

[11] Patent Number: 4,802,398

[45] Date of Patent: Feb. 7, 1989

[54] DIAGONALLY REINFORCED MECHANICAL PACKING

[75] Inventors: George B. Champlin, Stoneham, Mass.; Charles F. Swan, Brooklyn, Me.

[73] Assignee: New England Braiding, Inc., Manchester, N.H.

[21] Appl. No.: 943,950

[22] Filed: Dec. 18, 1986

[51] Int. Cl.$^4$ .................. D04C 1/06; D04C 1/12; F16J 15/22; F16J 15/26

[52] U.S. Cl. .................. 87/8; 87/1; 87/5; 87/7; 87/11

[58] Field of Search .................. 87/1, 5-8, 87/11, 33

[56] References Cited

U.S. PATENT DOCUMENTS

| | | | |
|---|---|---|---|
| 3,815,468 | 6/1974 | Matt et al. | 87/1 |
| 4,550,639 | 11/1985 | Champlin | 87/5 X |
| 4,559,862 | 12/1985 | Case et al. | 87/8 X |
| 4,672,879 | 6/1987 | Champlin | 87/8 X |

*Primary Examiner*—John Petrakes
*Attorney, Agent, or Firm*—Robert K. Tendler

[57] ABSTRACT

A braided mechanical compression packing including relatively low and high-strength yarns is provided with greater mechanical strength along a given diagonal direction to provide a reinforced corner by providing the higher strength yarn along only one diagonal track of the braider. This reduces extrusion of the packing from the confines of the stuffing box in which it has been sequentially installed; produces a packing with rectilinear non-symmetry having directionally different friction, for instance, to facilitate gravity return of a hydraulic ram; and lowers operating friction by reducing the overall amount of high-strength yarn in the packing braid.

10 Claims, 5 Drawing Sheets

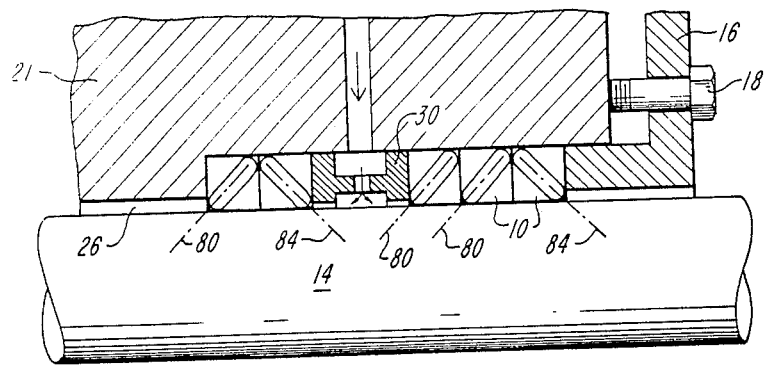
FIG. 6
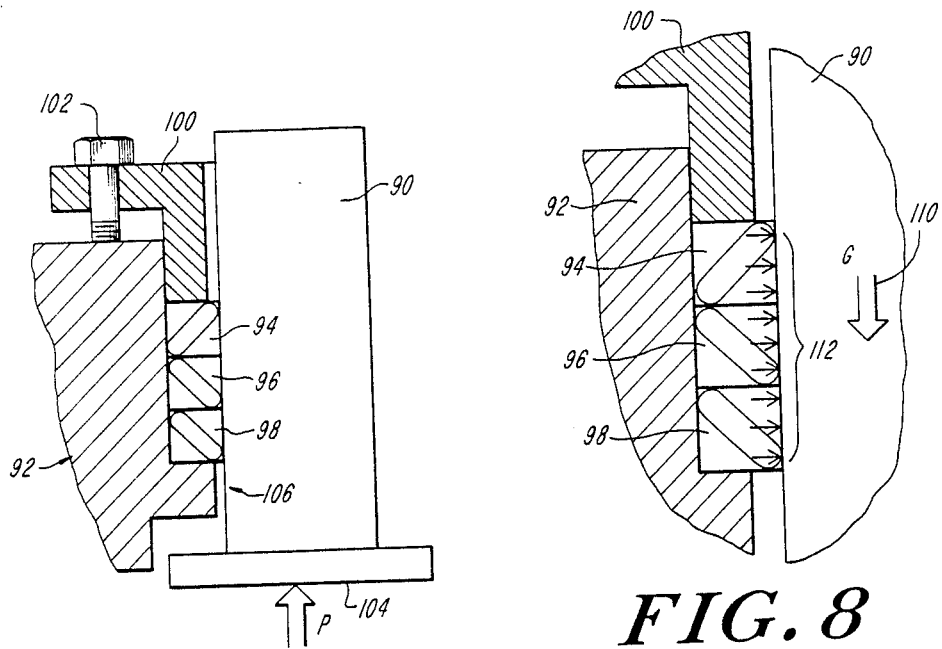
FIG. 7
FIG. 8

DIAGONALLY REINFORCED MECHANICAL PACKING

FIELD OF THE INVENTION

This invention relates to mechanical compression packing for controlling leakage about shafts and rods and in particular to a method of constructing a braided packing from yarns composed of two different materials that when placed within the braided packing provides the installed packing ring set with a higher strength along a single diagonal on each ring and creates a single reinforced corner per ring in contact with the shaft or rod.

BACKGROUND OF THE INVENTION

Because there are a wide variety of applications for mechanical packing and seals, including packing for pumps, valves, hydraulic and pneumatic equipment, a whole industry has grown up in their design and construction. In the areas with which the present invention is concerned, the packing is generally sold in relatively long coils of braided packing material of a square or rectangular cross section from which many suitable lengths may be cut. Conventionally, several lengths are cut from a coil of material of an appropriate cross sectional dimension for a given installation, each length being formed into a ring about a shaft, with the cut ends abutting each other. Often a half dozen or more rings are disposed about shaft with their sides in abutting relationship.

In a typical situation, a so-called packing or stuffing box surrounds the shaft. The interior of the stuffing box is of a diameter sufficiently greater than the shaft to accomodate the packing rings. An annular gland is fitted about the shaft and bolted to the exterior of the stuffing box in such a fashion that an end of the gland compresses the packing rings in the stuffing box. Tightening the bolts pulls the gland toward this housing and compresses the packing rings within the stuffing box. Under such compression, the packing tends to expand radially to some extent and substantially fill the stuffing box to prevent or minimize the escape of the contents of the equipment at the intersection of the shaft and housing.

Modern fiber manufacturing techniques have increased the number of materials available for the construction of packings. These new fibers have been made into so-called synthetic yarns that are in turn braided into packings which have increased heat tolerance and chemical resistance when compared to the natural fibers such as flax or cotton and metallic packings such as lead or aluminum or which are less hazardous when compared to mineral fibers such as asbestos, that were the norm up to about 1960. These newer synthetic materials include, but are not limited to, acryllic, aramid, carbon, glass, graphite and polytetrafluoroethylene (PTFE). All have been braided both alone and in combination with a variety of liquid and/or solid impregnants to form mechanical compression packings for both general and specialized applications. One of the newest popular yarns combines a PTFE matrix expanded about graphite particles and a so-called inert break-in lubricant, silicone oil, in tape that is folded into a yarn form. This material, manufactured by W. L. Gore & Associates is called GFO fiber.

Despite these advances, several well known problems exist with the basic stuffing box arrangement. One of these problems concerns extrusion of the packing into the small clearance between the bottom, or throat, of the stuffing box and the shaft and also between the gland and the shaft. This occurs if the pressure in the stuffing box is high enough to overcome the shear strength of the materials used in the packing, and is the result of an excessively large clearance at either location, over-tightening the gland bolts, excessively high seal water pressure, or a combination of these factors. When extrusion occurs, the friction of the packing increases, causing unwanted heat, dry running of the packing-shaft interface, and increased wear both of the packing and the shaft surface. There is also an increase in the power required to drive the equipment. Usually extrusion results in failure of the packing which is exhibited by uncontrolled leakage shortly after the extrusion occurs.

Another problem present in certain hydraulic cylinders that are used in presses and that depend upon gravity to lower the cylinder, is friction. Loads on the packing required to restrict leakage may be so high as to prevent or retard the return of the cylinder to its bottom position. To solve this problem, some packing manufacturers have created molded rings having hydraulically augmented sealing loads on the lips of these seals that contact the cylinder and stuffing box wall. This is expensive as individual molds may be required for each size of cylinder and stuffing box cross-section. Further, as many as three different mold shapes may be required to make a single set of these so called V ring packings if they are not installed in a continuous ring.

As a solution to the problem of extrusion and the prevention of so-called rolling in the stuffing box exhibited by some of the modern synthetic fibers when they are loosely braided or packed in the stuffing box, one manufacturer, New England Braiding Company, Inc., has developed and marketed a packing called Superpack 104 Bumblebee Packing. This packing is manufactured in numerous cross-sections on interlocking lattice braiding machines having 3 tracks and 20 carriers for smaller cross-sections and 4 tracks and 36 carriers for larger cross-sections. It combines two different yarn materials. One material, an aramid fiber monofilament containing PTFE and inert oil, such as silicone oil, as impregnants is made by E. I. du Pont de Nemours & Company, Inc. of Wilmington, Del. and is sold under the trade name of Kevlar IT packing yarn. This secondary yarn, appropriately plied to yield a given crosssection is braided from the yarn carriers following both corner or "x" tracks of the interlocking braiding machine upon which it is made. The primary yarn is the aforementioned GFO fiber yarn made by W. L. Gore and Associates, Inc. of Elkton, Md. Again, appropriately plied, this yarn is braided from yarn carriers following the inner or diamond track or tracks. There is one such track on the 3 track machine and two on the 4 track machine. The finished braid has the surface appearance of a series of lopsided Ns for the 3 track machine or "Ws" for the 4 track machine, each having yellow-colored corners and a gray-black color for the inner braid. Thus, all corners are reinforced, which while helpful, presents twice the amount of high strength yarn necessary to the surface of the shaft or rod which greatly increases unwanted frictional resistance and shaft or rod wear. Sometimes use of this yar prevents use in gravity return rams, as will be discussed.

Note center fill material of either or both yarns is used as appropriate to obtain the proper size and, as described in U.S. Pat. No. 4,550,639, included herein by reference, with appropriate warp placements can create a braid which resists "keystoning". This anti-keystoning packing has been found through field testing in the paper industry to resist the type of extrusion found with single-yarn packings.

While the anti-keystoning technique of the above patent impedes unwanted extrusion, the extrusion problem can sometimes exist because of yet another problem. The chemical resistance of the aramid fiber yarn, Kevlar IT is not as broad as that of the PTFE/graphite composite yarn, GFO fiber. This results in chemical attack that shrinks the aramid fiber portion of the packing, causing extra adjustment of the gland. Also, the heat transfer rate through the aramid yarn is not as high as that through the PTFE/graphite composite. Further, the aramid yarn is more abrasive, has greater running friction and wears shafts at a higher rate than the PTFE/graphite composite yarn.

It is therefore a primary object of the invention to reduce extrusion of packing materials while maintaining leakage protection and low friction.

It is a further object of this invention to reduce undesired friction and shrinkage of the packing to a minimum while retaining resistance to extrusion when the packing is installed in rotating equipment.

It is another object of the invention to create a packing that has higher resistance to fluid flow in one direction through the packing-shaft interface than in the opposite direction when installed for this purpose.

It is also an object of the invention to reduce undesired friction between the packing-rod interface during the return stroke when installed in a gravity return hydraulic ram.

SUMMARY OF THE INVENTION

In the present invention, which, in one embodiment is a two yarn system, the primary yarn is mounted on all yarn carriers of all tracks of the braiding machine except for all of the carriers which follow one of the two diagonal tracks or so-called x tracks of the braiding machine. The secondary, or higher strength yarn is mounted on carriers following only one diagonal track which prevents its overuse and reduces friction in the braided packing while eliminating extrusion. This means that the higher strength yarn is used on only one diagonal such that the secondary yarn is mounted on all of the carriers of this single diagonal track. This creates diagonal symmetry of the braided portion of the packing about either of the two diagonal tracks and asymetry when viewed cross-sectionally with respect to rectilinearity.

One of the results after sequential installation of the packing rings is a single reinforced corner or edge of the packing ring in contact with and adjacent to the shaft such that extrusion is eliminated.

Note that when describing the resistance of a yarn, the term resistance refers additionally to abrasion resistance, leakage resistance, chemical attack resistance or any or all of the above. Moreover, the word strength means yield strength, ultimate strength, modular strength and/or shear strength.

The diagonal braiding with a high strength yarn along only one diagonal provides differential resistance to fluid flow in the axial direction between the packing and the shaft about which it is wrapped when installed; provides resistance to extrusion between the packing gland and a shaft and also between stuffing box bottom and shaft when installed to provide extrusion resistance; and provides directionally different friction against a reciprocating rod to permit, for instance, gravity return of a rod or ram.

Specifically, the braiding of the high strength yarn on the single diagonal track or so-called x track of the braiding machine allows the selection of an extrusion resistant yarn such as the aramid fiber yarn aforementioned in combination with a relatively more corrosion resistant and lower friction yarn such as the PTFE/graphite yarn also aforementioned and creates a braided packing which maximizes the advantage of each yarn. When used in a set of packing rings arranged in a stuffing box in equipment with a rotating shaft such tha the high-strength extrusion-resistant yarn braided from the carriers following the single diagonal track, i.e. aramid fiber, contacts the bottom of the stuffing box at the clearance between shaft and stuffing box bottom, i.e. the throat, the extrusion of the packing at the throat is virtually eliminated. Similarly, the balance of the braid may then be constructed by braiding the relatively more corrosion resistant, lower friction and higher heat transferring yarn from carriers mounted on all the other track or tracks, i.e. the PTFE/graphite composite yarn. This places a relatively greater axial length of the lower friction corrosion-resistant and high heat transferring yarn in contact with the packing-shaft interface, lowering friction, its associated heat, and shrinkage of the packing due to chemical attack.

In another application of the invention, the extrusion resistant yarn on the single diagonal track is placed such that the corner containing this yarn at the packing-shaft interface is toward the end of the stuffing box having the highest pressure. In such a piece of equipment, which might be a gravity return reciprocating hydraulic ram, the packing ring would, if made from properly chosen yarns, exert a greater resistance to leakage under hydraulic loading as compared to a packing having all corners made with only one type yarn. When the pressure is applied to the ram, the corner nearest the throat and having the highest resistance puts a higher loading on the surface of the ram, i.e., the corner tries to move toward the ram. Thus, the corner tends to rotate inwardly to apply a high inwardly-directed force which resists leakage by inward friction at this corner. When the ram pressure is relieved in such equipment, this packing ring rotates back to its normal position and the friction at this corner equals that of the rest of the packing which is relatively low. This low friction permits the gravity return while still preventing leakage when the ram is actuated.

Thus, in the present invention, one yarn of a given material composition is mounted on all of the yarn carriers on all tracks of the braiding machine except for all of the yarn carriers that follow either one of the two diagonal or so-called X tracks of the braiding machine. The second yarn is mounted on all of the carriers following this one single diagonal track and the yarns are braided together from the yarn carriers following their respective tracks.

For specific application purposes or cost saving, the secondary yarn, or for that matter, a third or even fourth yarn material could be used as warps or axial fill material as appropriate since the fill material or its distribution does not relate to the purpose of the invention.

In summary, braided mechanical compression packing is provided with directionally greater strength in a given diagonal direction by braiding yarns along a single given diagonal with a higher strength yarn. Thus, with a minimum of undesireable abrasive high-friction, high-strength yarn, the resulting packing operates to reduce undesired leakage between the packing and the shaft about which it is wrapped, by reducing extrusion of the packing from the confines of the stuffing box in which it has been sequentially installed; to produce directionally different friction in reciprocating service that permits gravity return of rams and to lower operating friction when constructed from low friction materials in comparison to present packings constructed from the same two materials but in a different manner.

BRIEF DESCRIPTION OF THE DRAWINGS

These and other features of the subject invention will be better understood in conjunction with the Detailed Description taken in conjunction with the Drawings, of which:

FIG. 3C representing a four-track interlocking or so-called lattice braid most commonly formed with 36 yarn carriers either having a single type of yarn braided from all of the carriers; or, as illustrated, having two different kinds of yarns braided from the carriers, one kind braided from the carriers of the F and J tracks and the second kind braided from the carriers of the G and H tracks;

FIG. 6 is a cross-sectional and diagrammatic illustration of an assembly similar to that of FIG. 5 in which a lantern ring is utilized intermediate the internal rings of packing material, with the outer rings having their diagonals located such that their reinforced corners are either at the throat or gland-shaft interface; whereas, the rings adjacent the lantern ring have their reinforced corners adjacent the interface between the lantern ring and the shaft;

FIG. 7 is a diagrammatic and cross-sectional illustration of a gravity return ram illustrating the diagonally reinforced corner adjacent the throat of the stuffing box, with a further reinforced corner at the gland-ram interface;

FIG. 8 illustrates the operation of the gravity return ram of FIG. 7 in which only moderate uniform inwardly directed forces are applied by all rings of the packing material during the gravity return of the ram;

DETAILED DESCRIPTION

By way of further background, most mechanical impression packing is formed on plait (so-called square) or interlocking (so-called lattice) braiding machines by braiding yarns from moving yarn carriers about axial warp yarns in such a fashion that the warp varns provide fill which is symmetrical about the core of the packing. Alternatively, as described in U.S. Pat. No. 4,550,639, resistance to the keystone effect created when wrapping packing rings about a shaft or rod is provided by non-symmetric arrangements of warps, especially by removal of warps at the inner corners of the packing. Thus, most packings contain warp yarns and carrier yarns wrapped or braided around the warp yarns.

With respect to the carrier yarns, symmetry exists at present in the braided portion of the packing whether or not one or two yarns are used in the braid. That is, one yarn is mounted on the carriers of all tracks of the braiding machine, or, two yarns are mounted on the carriers such that one yarn is on the corner track carriers and the second is on the center track carriers.

Moreover, in the past, two and even three yarns are mounted on carriers which follow all tracks of the braiding machine. There is symmetry even in this case as the yarns are mounted on alternating carriers on each track in the case of two yarns, or on every third carrier in the case of three yarns. In this latter case, the carriers and yarns are arranged as described above, unless the same yarn is to be mounted on two adjacent carriers on one track, wherein the order of mounting on the carriers of that track has a deviation from the established order.

There is also an existing packing having a second yarn which differs from the primary yarn mounted on all carriers of the outer tracks and almost all carriers of the central tracks. This so-called tracer yarn is mounted on one or more carriers following the central tracks of the interlocking or lattice braiding machine. However, none of the above use one high strength yarn braided from carriers following only one single diagonal track to provide a corner with exceptionally high strength to prevent extrusion. Further, none of the above provide diagonal symmetry of the packing about yarn braided from carriers following this single track, which is useful not only for extrusion prevention, but also for tailoring the friction and leakage prevention requirements to a number of specialized situations.

Figure 1A:
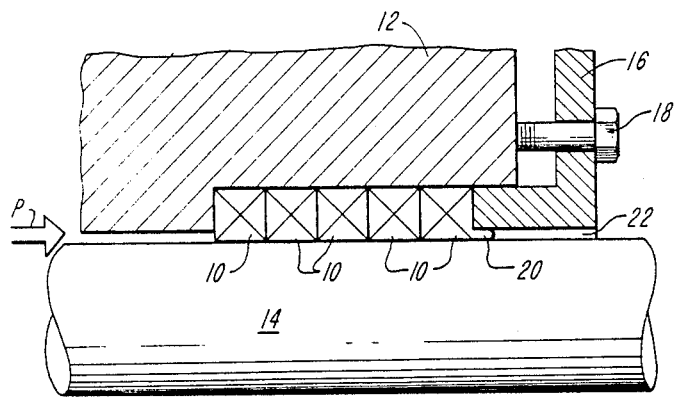
FIG. 1A is a schematic view in partial cross-section of a shaft passing through a stuffing box with a seal formed of 5 rings of packing material which are compressed by a bolted gland, illustrating extrusion under the gland, with pressure applied in the direction shown.

Referring now to FIG. 1A, a conventionally braided set of five rings 10 consisting of mechanical compression packing are installed in a stuffing box 12 about a shaft 14 to create a seal between the shaft and the stuffing box when the packing set is compressed axially by a gland 16 that is tightened by a bolt 18. In this so-called clean service system illustrated, a fluid pressure P from inside the equipment of which the stuffing box is a part is exerted on the packing material and/or the shaft such that the extrusion 20 occurs in the small clearance 22 between gland 16 and the surface of shaft 14.

Figure 1B:
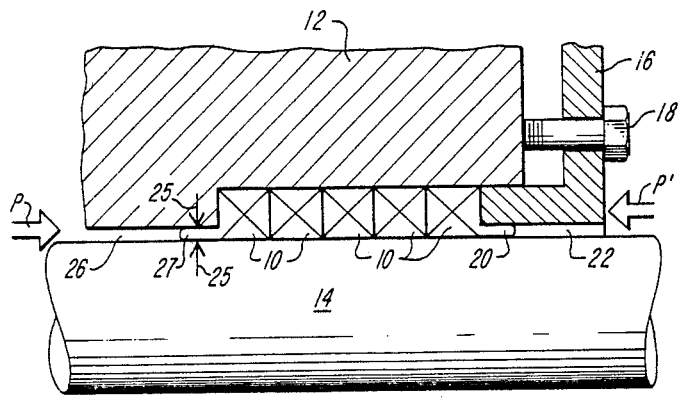
FIG. 1B is a schematic view in partial cross-section of the device of FIG. 1A showing that extrusion can occur at the throat of the stuffing box due to pressure applied to the gland as well as under the gland as above.

Likewise in FIG. 1B, should the packing 10 be compressed via gland 16 and bolt 18 so as to produce a sufficiently high pressure P' on the packing 10 in the direction indicated, there may be not only the extrusion 20 between the gland 16 and shaft 14, but also because of clearance shown by arrows 25 at the bottom of the stuffing box that is known as the "throat" 26 of the stuffing box there will be an extrusion 27 of the packing material 10 at the throat 26 of stuffing box 12.

Similarly, but not illustrated separately, when sufficient clearance exists at the throat 26 of the stuffing box 12, extrusion 27 may occur without a corresponding extrusion 20 under the gland 16 in certain installations.

Figure 1C:
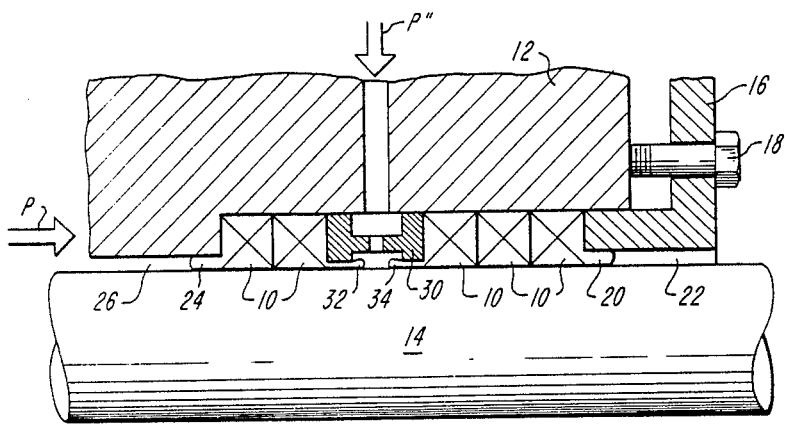
FIG. 1C is a diagrammatic illustration of a different type of stuffing box in which the seal is formed as above, but which has a lantern ring which is utilized to introduce seal water for so-called "dirty service applications" in which extrusion may not only occur at the aforementioned gland and stuffing box junctures with the shaft; but, also under and into the lantern ring.

Referring to FIG. 1C, in a so-called dirty service application, when a lantern ring generally indicated by 30 is utilized in combination with stuffing box 12, extrusion can occur not only at 91 and 16 as illustrated at 20 or at throat 26 as illustrated at 24; more importantly, extrusion can get into lantern ring 30 as illustrated at 32 and 34 thereby to block the sealing water which is pumped into the lantern ring under pressure P", that is normally greater than pressure P, and both flushes the packing and maintains a fluid film between the packing 10 and shaft 14.

It should be noted that after compression by the gland, a properly performing packing should seal the shaft to the stuffing box with minimal leakage. This assumes that equipment in which the packing is placed is in good running condition and that other factors affecting good packing performance are also within the ability of the packing to compensate for shaft vibrations, whip, out-of-roundness, shaft wear; and, of importance to this discussion, stuffing box, lantern ring and gland clearance over the shaft.

It is common knowledge in the art of braided packing, when equipment is to be packed, time is often of the essence, and the worn parts on a piece of equipment, being relatively more expensive than the packing, are not on hand prior to the repacking, and are thus not replaced in timely manner. Thus the packing does not last as long as it should if the conditions of operation were proper. A special concern is the clearance between the bottom of the stuffing box and the shaft. While the shaft, or the sleeve on the shaft, are replaced occasionally during the life of the equipment, the stuffing box is rarely replaced even when the throat clearance becomes excessive due to corrosion or wear from contact with the shaft or other sources. The same condition frequently develops with respect to the gland and the lantern ring when it is used.

These clearance problems which are due to defective or worn parts exacerbate the problem of extrusion of the packing material. Thus, under optimal circumstances where packing material may not extrude between the throat of the stuffing box and the shaft or between the gland and the shaft, common usage results in extrusions of the packing material when proper maintenance procedures are, as is common, not rigorously followed.

The result of either too much initial clearance between the stuffing box and the shaft or clearance provided by worn parts and the like, is that the packing set fails and there is a subsequent undesired loss of fluid from the equipment as well as costly increases of power consumption and unplanned down-time.

To combat this condition, packings that resist extrusion have been developed. Their construction includes the utilization of secondary yarns on both the corner tracks of the braiding machine. These secondary yarns, in general, have a lower chemical resistance or higher friction than the desired primary yarn. Thus, simply substituting these yarns for the primary yarns to avoid extrusion, reduces the idealized packing life as compared to packing made only from the preferred primary yarn. However, its use allows the packing to function longer in practice due to the adverse conditions normally encountered in equipment. On the other hand, the over-use of the secondary yarns braided from the carriers on both diagonal or X tracks results in unwanted friction, resultant heat generation and higher than ideal shaft and packing wear.

It should be noted that in the discussion above, the secondary yarn referred to is used on the corner tracks of both three and four track interlocking braiding machines. In several cases of smaller cross-sections in the prior art, it actually comprises a greater percentage of the total weight of the packing than the desired primary yarn. In both cases, there is the aforementioned over-use of the secondary yarn, which while satisfactory for some applications, still results in increased friction heat and wear.

As will be seen, the present invention minimizes the use of the undesired secondary yarn by limiting its use in the packing braid to carriers following only one diagonal track of the packing machine thus generating the one high strength corner of the braid in contact with the shaft required to resist extrusion.

Figure 2:
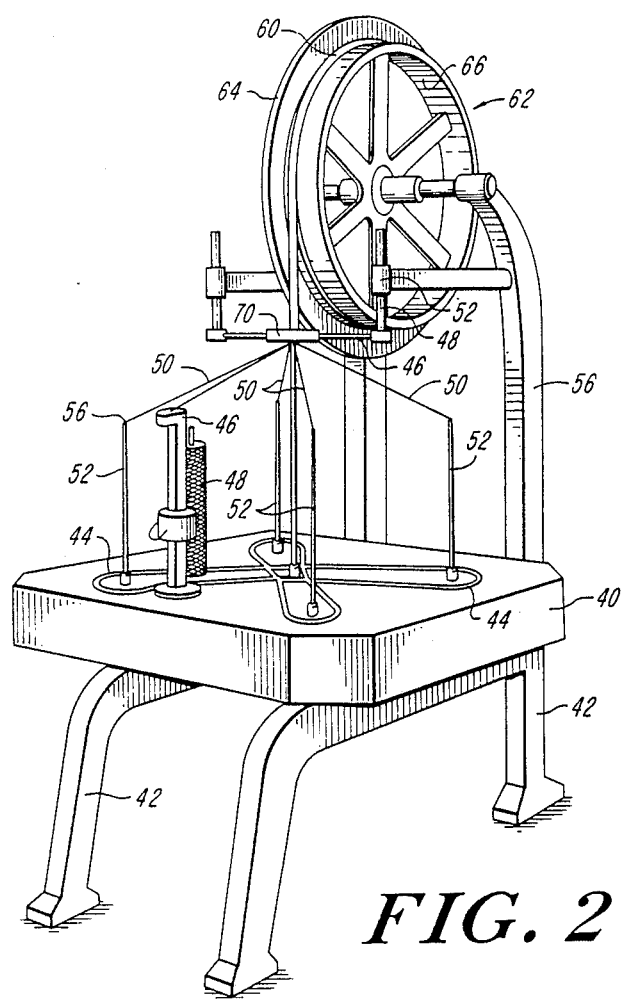
FIG. 2 is a diagrammatic illustration which shows a braiding apparatus illustrating the diagonal tracks or so-called X tracks of the machine, warp yarns which come up vertically through warp tubes in the center of the tracks, and one yarn carrier which is made to follow along one of the two X-tracks illustrated and thus revolve around the warp yarns

Prior to describing the cross-sectional construction of the braid and referring now to FIG. 2, a typical simple braiding machine is illustrated as it is depicted in U.S. Pat. No. 3,646,846.

Here, a known form of braiding machine comprises a flat table 40 mounted on supports 42, with the table having continuous slots 44 or so-called tracks that define a more or less undulating path back and forth and in various directions across the table. Slideably mounted upon the table and at various spaced points along slots or tracks 44, are plural yarn carriers 46 (only one being shown), each carrying a package 48 of yarn; and these carriers are moved upon the table in and under the guidance of the slots or tracks by suitable gear means (not shown) under the top of the table. Yarn drawn from these carriers becomes what may be termed the "braided yarn" of the finished braided packing.

These yarns are the braided yarns, whereas, in general practice, the braided yarns are braided about axially running warp yarns 50 which, in one embodiment, are fed out of corner masts 52 which exist at the corners or loops of the braid track. Strands of warp yarn drawn from yarn rolls (not shown) beneath the table are drawn upwardly through eyelets 56 at the upper ends of the masts. There the strands or warps become axial longitudinal side strands (axial warp yarns) in the finished braid. This finished braid is diagrammatically illustrated at 60 to be drawn upwardly over a wheel 62 having an integral gear 64 by means of which the wheel is rotated. The rim of the wheel is in the form of a narrow drum 66 about which one or several turns of the braid may extend and be tightened by means (not shown) to prevent spillage of the braid from the drum and hence cause upward pull of the braid formed from the yarns braided from the moving carriers and the axial warp yarns. Note that strands 50 are formed through a braiding die 70 held in place by suitable apparatus.

What will be apparent from this type of machine, which is in general an X-track machine, is that braiding yarn distributed from carrier 46 is braided about warp yarns, with the carriers being moved about along the various tracks.

While the above illustrates a most simplistic type of braiding machine, the principles of the machine are clear in that warp yarns, when used, are surrounded by braided yarns, with these braided yarns, as will be described in connection with FIGS. 3A-3C being either all of the same variety or of two distinct varieties, with the two distinct varieties being symmetrically placed along the corner or X tracks to give the cross-section of the packing both line and point symmetry. Thus, while in the prior art, there have been packings either utilizing only single types of braiding yarns or multiple types of braiding yarns, the result is a symmetrical braid when viewed in cross-section.

Figure 3A:
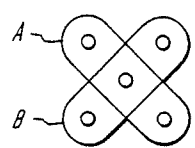
FIGS. 3A, 3B and 3C are diagrams depicting prior art braided packings with FIG. 3A representing a two track plait or suare braid having a single type of yarn on the carriers of both tracks; with FIG. 3B illustrating a three-track interlocking or so-called lattice braid most commonly formed with twenty yarn carriers either having a single type of yarn braided from all of the carriers on all three tracks; or, as illustrated, two different kinds of yarns braided from the carriers, one kind braided from the carriers of tracks C and E, and the second kind braided from carriers of track D.

In FIG. 3A, there is illustrated a schematic cross-section of the conventional plait or squar pattern of packing braid composed of yarns placed on yarn carriers, typically eight or sixteen in number, which follow the paths A and B, in which all of the yarns on the carriers are of the same material or are of a primary material, with a second material placed on one or two carriers at random for the purpose of providing a so-called "tracer" yarn that is used for identification. The small circles represent the points of possible axial warp yarns within the braid that may or may not be present and which are used to control the size of the finished packing.

Figure 3B:
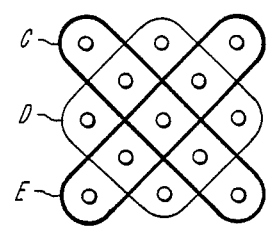

In FIG. 3B, a similar schematic cross-section of braided packing material of prior art is shown. In this instance, a 20 carrier interlocking or lattice pattern is illustrated. Each of the carriers may have yarns placed upon it that are composed of a primary material, with a second "tracer" material generally placed at random on one, two or three of the carriers on the central track D that are braided from the yarn carriers following the paths C, D and E. The small circles here and on all subsequent drawings represent the points of possible axial warp yarns that may or may not be used within a specific piece of packing material and that are generally used for the purpose of size control. It should be noted that braiding machinery exists having tracks as illustrated but with different numbers of carriers. It should therefore be noted that this invention is not limited by the number of carriers used with a particular track pattern.

FIG. 3B also illustrates schematically and in cross-section prior art packing material braided in the 20 carrier interlocking lattice braid pattern with two different yarns each composed of a given but different composition braided from the yarn carriers. Here, one yarn is mounted on the carriers follwing the paths C and E and the second yarn of the second composition is mounted on the carriers following the D path.

Figure 3C:
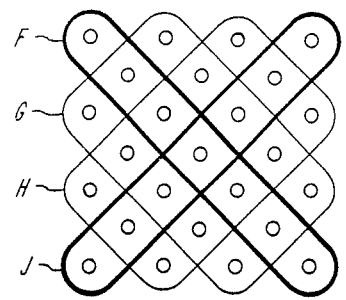

FIG. 3C illustrates yet another schematic cross-section of prior art braid, this one having a four track pattern as generated by a 36 carrier interlocking lattice braid pattern. While not illustrated, a single composition of yarn material can be used on all carriers and is braided from the carriers which follow paths F, G H and J. This single yarn construction, with respect to the carriers, may be varied as before by the use of a tracer yarn used on one or more carriers in a random pattern.

What is illustrated in FIG. 3C is that two yarns of differing composition are used. One of the different yarns being placed on the carriers which follow the paths F and J, with the other, second yarn being placed on the carriers following the paths G and H.

Figure 4A:
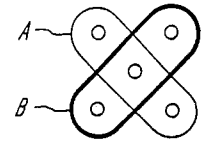
FIG. 4A is a diagrammatic representation of the subject invention showing a cross-section of the present braid as braided from carriers of a plait or square braider comprised of two different kinds of yarn, one braided from carriers of track A and the other braided from the carriers of track B, with the B track carrying the yarn of higher strength.
Figure 4B:
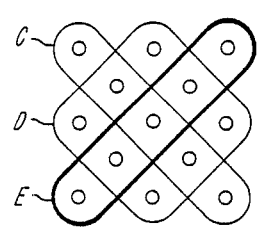
FIG. 4B is a diagrammatic representation of the subject invention as braided from the carriers of a three track interlocking or so-called lattice braiding machine comprised of two different types of yarn, one braided from the carriers following the C and D tracks and the secondary yarn braided from the carriers following the E track, with the yarn braided on the E track carriers being the yarn of higher strength.
Figure 4C:
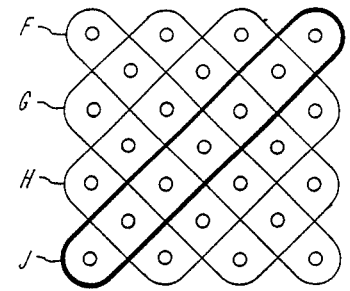
FIG. 4C is a diagrammatic representation of the subject invention braided from the carriers of a four-track interlocking or so-called lattice braiding machine comprised of two different kinds of yarns, one braided from the carriers of tracks F, G and H, and secondary or higher strength yarn braided from the carriers following track J.

The present invention is illustrated in FIGS. 4A-4C. These show the schematic cross-sections of the present invention as applied to a two track 8-carrier plait, or square braider; a three track 20-carrier interlocking, or lattice braider; and a four track 36-carrier interlocking, or lattice braider.

Referring now to FIG. 4A, this figure illustrates a braided packing constructed from yarns of two different compositions and braided on a 8-carrier plait, or square braiding machine. Here all of the carriers following one path A contain yarn of one composition although multiple plies of the yarn might be desired for sizing reasons. All of the carriers following the second path, B, contain the yarn of the second composition. Again, multiple plies of the yarn might be desired for sizing reasons. The small circles within the illustrated carrier paths A and B represent possible warp yarn positions which may or may not be used. If used, they may even contain a yarn of a third composition or a combination of the two yarns used upon the carriers or any combination thereof which may be suitable for a particular application or sizing requirement of the braided packing. It will be seen that all of the yarns on the carriers following the path A are of the same composition and that all of the yarns on the carriers following the path B are of a secondary high-strength composition, with the secondary yarn illustrated by the darker line providing the diagonal corner strengthening.

FIG. 4B illustrates a three track 20-carrier interlocking or lattice braider. Here, the primary yarn i.e. the yarn used on the largest number of carriers, is placed on the carriers following paths C and D and braided from them. The secondary yarn, of differing and high-strength composition, is braided from the carrier following the path E. Irrespective of the yarn which may or may not be used as the axial center fill, the carriers following two adjacent paths or tracks on a braider containing three carrier paths or tracks contain yarn of one primary composition and the carriers following the third carrier path or track contain only yarn of the second composition. Here again, the higher strength diagonally positioned yarn is illustrated with a darker line. Note that a tracer yarn could be used for identification purposes on carriers following either of the two adjacent paths having carriers with the primary yarn on them without affecting the invention.

FIG. 4C represents a four track 36-carrrier interlocking lattice braider. Here, the primary yarn plied as appropriate for size, is mounted on the carriers that follow the paths F, G and H and are braided from them at the same time as the secondary high-strength yarn, also plied as is appropriate for size, that is mounted on the carriers that follow the path J. Again, one, two or more tracer yarns could be mounted in a random manner on any one or more of the carriers following paths F, G and H for the purpose of identification without affecting the performance of the present invention. Also, the internal axial warps which might or might not be inserted at the small circles might be composed of either the primary yarn or of the secondary yarn or even of another composition altogether for a given application without affecting the present invention.

In considering the foregoing illustrations, it should be mentioned that the present invention applies if the braid is constructed in mirror image. This is to say that: in FIG. 4A, the yarns noted can be reversed from the carriers following path A to the carriers following path B.

Similarly, in FIG. 4B, the primary yarns mounted on the carriers following path C could be mounted on the carriers following path E, provided the secondary yarns mounted on the carriers following path E are in turn mounted on the carriers following path C.

Also, in FIG. 4C, the primary yarn mounted on the carriers following path F could be reversed with the yarn mounted on the carriers that follow the path J.

Figure 5:
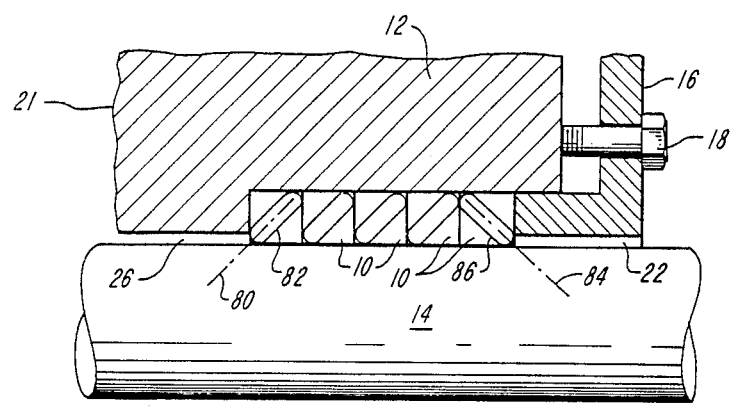
FIG. 5 is a cross-sectional and diagrammatic illustration of the present invention having diagonally braided yarns oriented as illustrated, which when installed as packing rings in a stuffing box with a packing gland prevent extrusion at both the throat and the gland-shaft interface.

Referring now to FIG. 5, in the clean service application, extrusion can be completely eliminated both at throat 26 and gland clearance 22 through the utilization of packing materials which have the diagonal track high-strength fiber described above. It will be appreciated that the diagonals on which these are located are such that, as illustrated in FIG. 5, the diagonal at throat 26 is illustrated by dotted line 80 and loop 82 whereas, with respect to the gland-shaft clearance, the diagonal is located on dotted line 84 as indicated by loop 86. The intermediate rings, other than the one at the gland-ring interface, are slanted along the same diagonal, e.g. diagonal 80, although the configuration of these rings may be altered to suit the type of service involved. As will be seen, either at the throat 26 or at the clearance 22 between gland 16 and shaft 14, no extrusion occurs because the high-strength fiber corner is present within the stuffing box at these two clearances. The high-strength corner is therefore at a position at the clearance so as to prevent extrusion. Thus, while the high-strength yarns if utilized throughout the braiding might result in too low a chemical resistance or too high frictional resistance when located at these particular corners they exhibit the required high resistance to abrasion or wear so as to maintain the associated corner of the packing ring in place and prevent the packing rings from extruding out into either the throat or the clearance between the gland and the shaft.

Referring to FIG. 6, the lantern ring embodiment is shown with the utilization of the subject packing rings. As before, a ring 10 adjacent gland 16 has its high-strength yarn along a diagonal 84, with the next adjacent packing rings having their high-strength yarns along diagonals 80, such that with respect to the lantern ring 30, the high-strength corner of the adjacent ring is at the edge of the inside diameter of the lantern ring at the interface between the inside diameter of the lantern-ring and shaft 14. Thus, for instance, the ring to the immediate left of the lantern ring has its high-strength yarn loop along diagonal 84 so as to present a reinforced corner to this portion of the edge of the inside diameter of the lantern ring. The ring to the left-most portion of the stuffing box has its high-strength yarn along diagonal 80 so that it presents a corner which is reinforced at the throat 26, just as was the case in FIG. 5.

The arrangement of the diagonals of the rings can vary with the type of service involved, it being understood that the place where clearance can occur and therefore extrusion can occur, is to be provided with the corner of the packing material which is reinforced with a yarn of high-strength thereby preventing extrusion.

While all of the foregoing discussion makes reference to illustrations having packing ring sets containing 5 rings, it will be appreciated that packing ring sets containing numbers of rings other than 5 which are appropriate for the equipment may be utilzed with the same advantage when similarly sequentially arranged. Thus, the number of rings used in a particular application is not a limitation to the subject invention.

While the aforementioned configuration has mainly focused on the extrusion problem, and referring now to FIG. 7, in a gravity ram type situation, a ram 90 is generally guided by a bushing (not shown) and is sealed via a stuffing box, a portion of which is shown at 92, which has packing rings 94, 96 and 98 in between the stuffing box and the surface of the ram. The rings are held in place by, in one embodiment, a gland 100 which is clamped in place via bolt 102. It is the purpose of the packing rings to seal against fluid pressure while, at the same time, allowing downward movement of the ram 90 when pressure P is removed from face 104 of ram 90. This gravity-induced movement of the ram usually requires packing materials of very low frictional characteristics. However, those types of packing rings, in general, are most subject to extrusion. In order to solve the extrusion problem while nonetheless providing a relatively low friction gravity return for the ram, the specialized rings made in accordance with the subject invention are oriented as illustrated in FIG. 7. Note that with respect to throat 106 of stuffing box 92, the diagonal reinforced yarn is as shown with its corner at the throat between the stuffing box and the surface of the ram. It will be noted that while this is the case for ring 98, with respect to ring 94, its reinforced corner is at the interface between the gland and the surface of the ram.

While the subject configuration, as shown in FIG. 7, prevents extrusion both at the throat and at the gland, its function is more easily seen to enhance the performance of gravitational return rams by referring to FIGS. 8 and 9A-9C.

Referring to FIG. 8, during the gravity return of ram 90 as illustrated by arrow 110, it can be seen by arrows 112 that when the ram is moved downwardly, the inwardly directed pressure produced by all of the rings 94, 96 and 98 is slight and approximately uniform thereby permitting the ram to drop under its own weight.

Figure 9A:
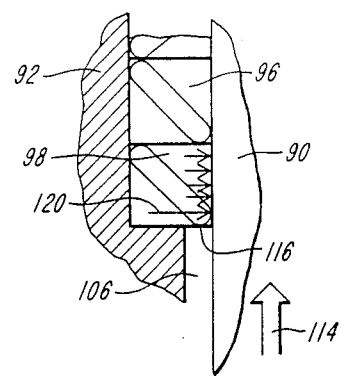
FIG. 9A is a diagrammatic illustration of the additional inward force produced by the corner of the ring adjacent the throat of the stuffing box, which increased force resists leakage during ram actuation.
Figure 9B:
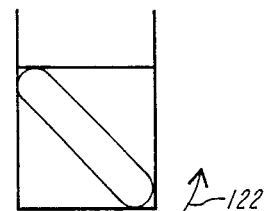
FIG. 9B is a diagrammatic illustration showing the rotation of the corner of the ring of FIG. 9A as indicated by the arrow.
Figure 9C:
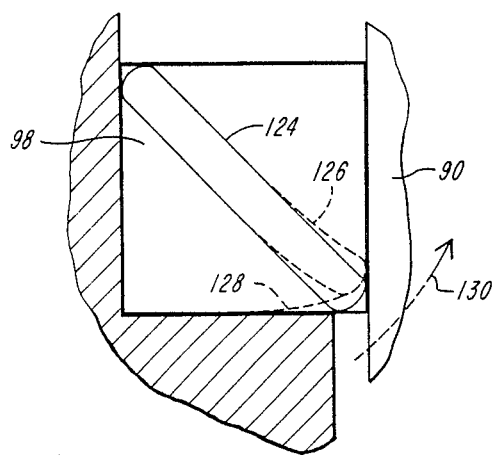
FIG. 9C is a diagrammatic illustration of the rotation of the ring of FIG. 9B showing in dotted outline the rotation of the corner and the distortion of the corresponding ring such that the reinforced corner produces the increased inwardly-directed frictional force to reduce leakage as well as any extrusion which may occur at this corner.

Referring to FIG. 9A, when the ram is placed under hydraulic pressure or actuation as illustrated by arrow 114, the corner 116 which is reinforced at throat 106 produces an increased inward force as illustrated by arrow 120 due to a phenomena shown in FIG. 9B in which corner 116 atempts to rotate as illustrated by arrow 122 so as to deform ring 98 slightly. This deformation is shown in dotted outline in FIG. 9C in which the high-strength yarn 124 is displaced upwardly and inwardly as illustrated by dotted line 126, with the bottom 128 of the packing moving slightly upwardly with the upward movement of the ram as illustrated by arrow 130. This slight deformation of bottom ring 98 is effective to place increased pressure against the surface of the ram due to the high strength yarn.

What will be appreciated is that during the gravity return stroke, the resistance at corner 116 is slight and matches that of the resistance produced by the other rings. However, upon actuation of the ram, the bottom ring is slightly rotated, with its high strength corner producing an intense sealing pressure as illustrated by arrow 120 of FIG. 9A so as to permit the sealing of the ram to the associated stuffing box thereby preventing leakage as well as preventing any extrusion during gravity return.

It will therefore be seen that the subject diagonally reinforced braiding permits the majority of the braid to be of relatively low friction yarn to permit gravity return while, at the same time, during the hydraulic actuation stroke prevents not only extrusion but also increase the sealing capacity without otherwise increasing friction which would prevent gravity return. This low friction directional result permits faster actuation of hydraulic gravity return rams by lowering the friction during the gravity return, while increasing the friction at least at the throat during the hydraulic actuation process.

While high strength yarns of the aramid type such as the aforementioned Kevlar IT packing yarn from E. I. DuPont may be used, with or without the anti-keystone warp configurations of the aforementioned patent, it will be appreciated that the invention is not limited to the embodiments illustrated. Variation in applications, structural details, numbers of rings, materials of construction of the packing rings are within the scope of the subject invention so long as there is a secondary high-strength yarn braided from carriers following only one corner path or so called X track of the braiding machine, with the primary yarn being braided from the remainder of the carriers following the other paths. Note that tracer yarns may be used without affecting the operation of the subject invention. Moreover, the primary yarn may be the Ultra I & T packing yarn from the E. I. du Pont de Nemours & Co. which is Teflon, e.g. polytetrofluoroethylene, plus approximately 8% Nomex which is an aramid fiber, the fibers being impregnated with approximately 40% of Teflon PTFE suspensoid, which is then dried. The finished product is treated with dimethylpolysiloxane which is oil.

Having above indicated a preferred embodiment of the present invention, it will occur to those skilled in the art that modifications and alternatives can be practiced within the spirit of the invention. It is accordingly intended to define the scope of the invention only as indicated in the following claims.

We claim:

1. A method for preventing packing extrusion by increasing the strength of a corner of a mechanical compression packing braided on a braider having X-tracks, including the steps of:

providing a high strength yarn braided from the carriers following only one given diagonal X track to provide only one reinforced corner adapted to lie adjacent a shaft to be sealed; and providing a different and lower strength yarn braided from the carriers following all other tracks of the braider, whereby only a minimum of higher strength yarn is utilized in the braiding of the mechanical compression packing to eliminate packing extrusion.

2. A method for improving the operation of a gravity return ram in reciprocating service involving a stuffing box with rings of braided mechanical compression packing in the stuffing box and contacting the outer surface of the ram, comprising the step of:

utilizing a ring of braided mechanical compression packing having at least two braided yarns, with a higher strength yarn provided along a single given diagonal direction to provide a reinforced corner at the throat between the stuffing box and the surface of the ram; the other rings of packing material either being provided totally with lower strength braiding yarns or having the aforementioned high strength braided yarn in a predetermined direction along a given single diagonal, said rings being oriented about the ram such that during the gravity return stroke of the ram little resistance as presented to the surface of the ram; whereas, during ram actuation, the reinforced corner of the ring at the throat of the stuffing box is oriented such that it both seals the ram to the stuffing box and resists extrusion during the gravity return stroke.

3. An extrusion resistance mechanical compression packing ring, comprising:

a braided packing having a primary yarn braided along all but a given diagonal X track, and a relatively high strength secondary yarn braided along only one diagonal X track, thereby to provide a diagonally reinforced corner for the packing, with the remainder of the braided yarns being made up of yarns of different and lower strength, thereby to minimize the amount of relatively high strength yarn in the braid of the compression packing ring.

4. The braided mechanical compression packing of claim 3 wherein said secondary yarn is of an aramid composition.

5. The braided mechanical compression packing of claim 3 wherein the primary yarn contains polytetrafluoroethylene (PTFE) in fiber form with or without other ingredients.

6. A braided mechanical compression packing system including a number of rings of braided mechanical compression packing material having at least two braided yarns and adapted to be placed in a stuffing box having a throat and a gland to compress the rings about a shaft, at least one of the rings including a first braided yarn along only one given diagonal X track to provide a reinforced corner of the packing, with said first braided yarn being a yarn having a higher strength as compared to the other braided yarns in the packing, such that when said at least one ring is properly positioned in said stuffing box about said shaft, extrusion of braided yarn from said last mentioned ring is eliminated with a minimum of said higher strength yarn.

7. The braided mechanical compression packing system of claim 6, and further including at least two rings having the aforesaid higher strength yarn braided along one given X track to produce diagonal reinforced corners, with the reinforced corners being at both the throat and the gland-shaft interface.

8. The braided mechanical compression packing system of claim 6, and further including a lantern ring in the stuffing box, with the packing rings adjacent the lantern ring including reinforced corners at the lantern-ring shaft interface, said reinforced corners being provided by said higher strength yarn braided along a single diagonal X track, whereby extrusion into the lantern ring is prevented.

9. The braided mechanical compression packing system of claim 8, and further including rings having reinforced corners produced by said higher strength braiding yarn being braided along a single diagonal X track, with the reinforced corners thereof being at the throat of the stuffing box and at the gland-shaft interface of the stuffing box, whereby extrusion is eliminated both at the lantern ring and at the throat and gland-shaft interface.

10. The braided mechanical compression packing system of claim 6 wherein said higher strength yarn is of the aramid-type.

* * * * *